Feb. 27, 1951         F. H. TARLTON         2,543,385
                     CHANGE-SPEED GEAR
Filed July 12, 1948                      3 Sheets-Sheet 1
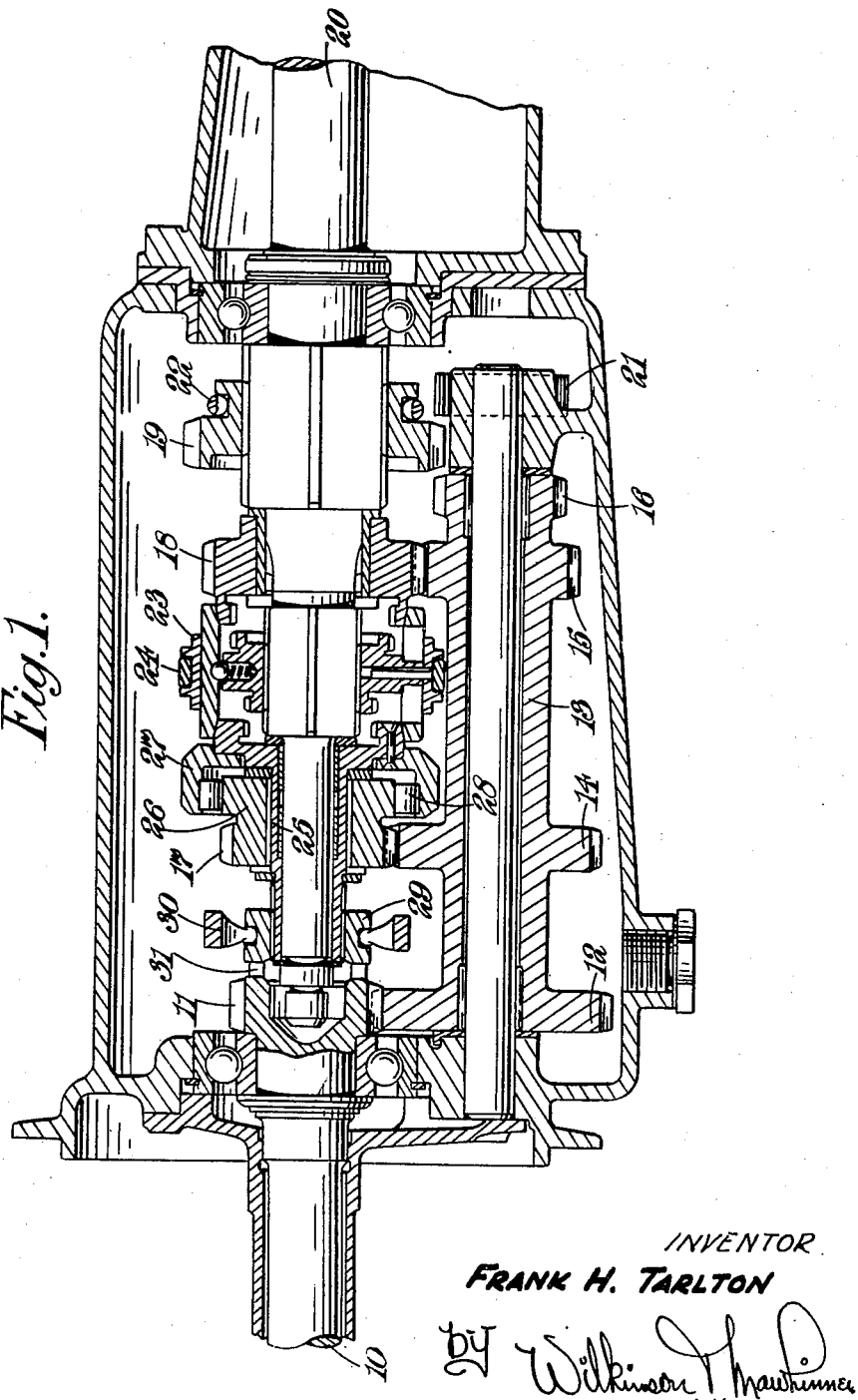
INVENTOR
FRANK H. TARLTON

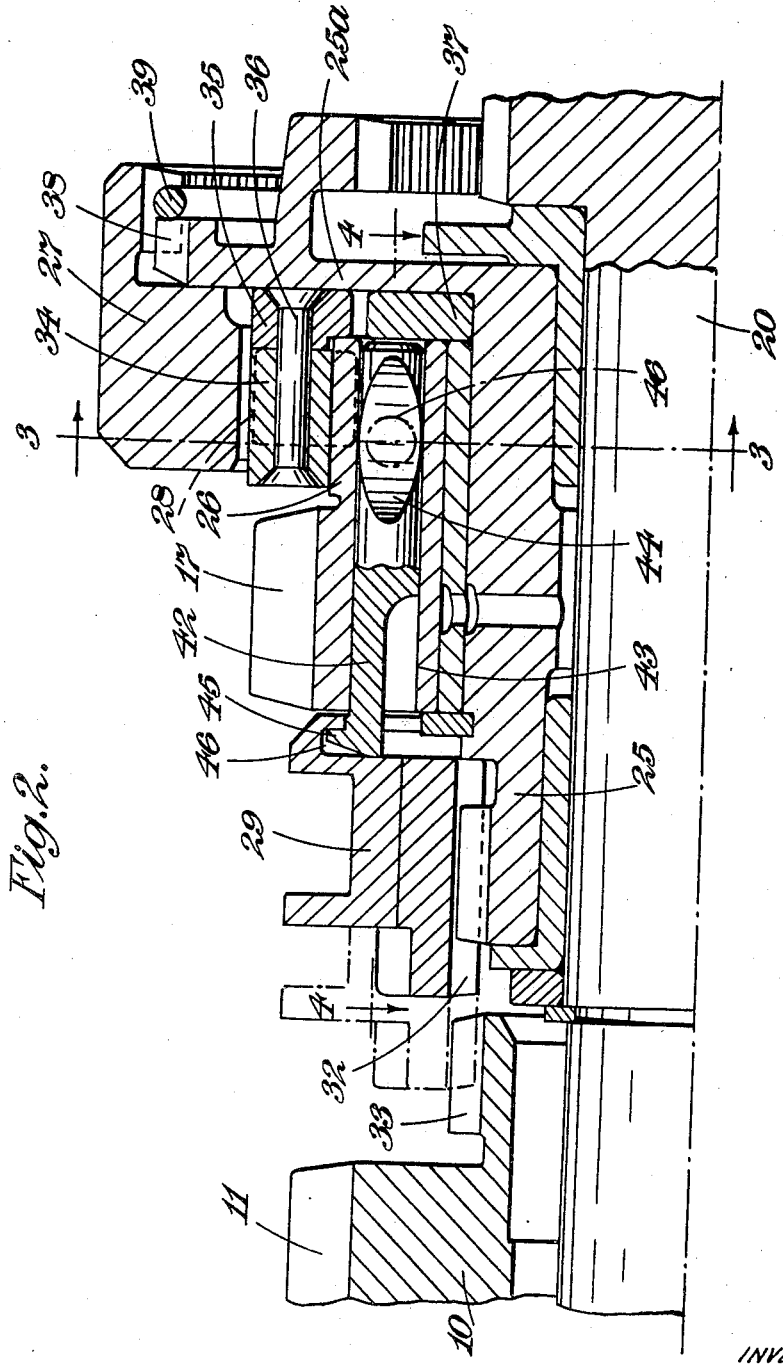

Feb. 27, 1951 F. H. TARLTON 2,543,385
CHANGE-SPEED GEAR
Filed July 12, 1948 3 Sheets-Sheet 3
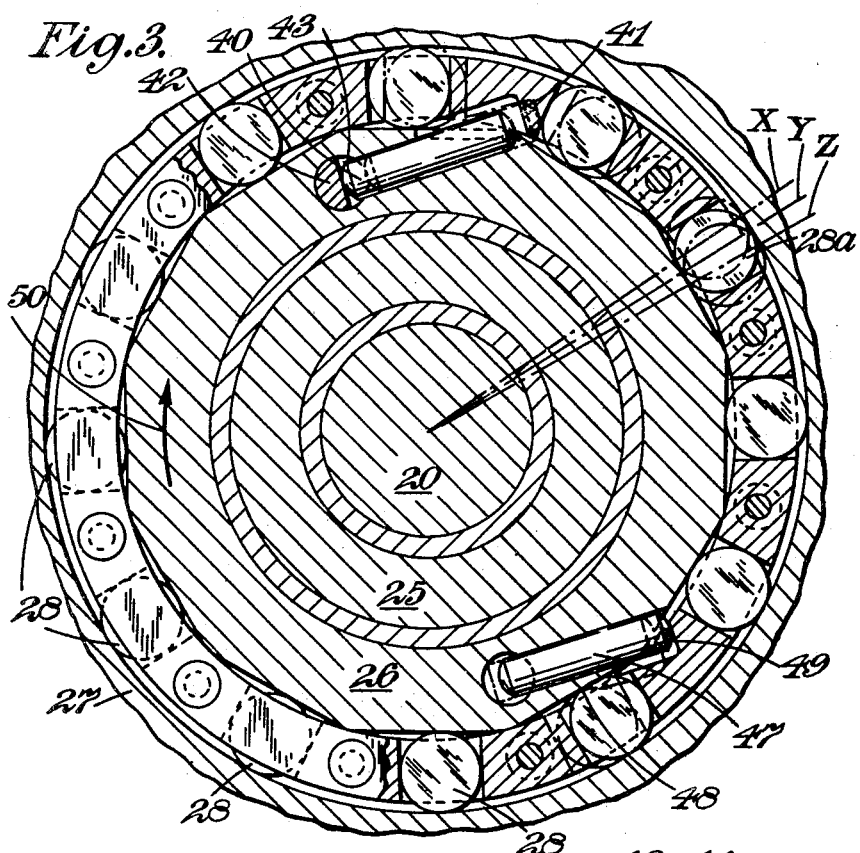
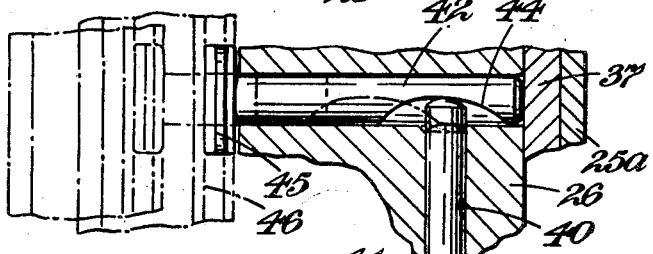
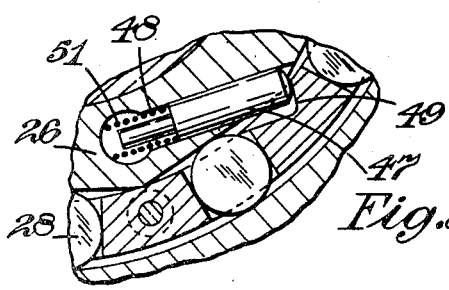
INVENTOR
FRANK H. TARLTON
BY Wilkinson Mawhinney
Attorneys Patented Feb. 27, 1951

2,543,385

UNITED STATES PATENT OFFICE 2,543,385

CHANGE-SPEED GEAR

Frank Henry Tarlton, Alvaston, England, assignor to Rolls-Royce Limited, Derby, England, a British company Application July 12, 1948, Serial No. 38,231
In Great Britain July 18, 1947

11 Claims. (Cl. 74—368)

This invention relates to change-speed gears, such as are used in cars, of the type which comprises a free-wheel clutch in one or more gear trains of different ratios arranged so as to transmit a drive from a gear train to the output shaft and so that the driven-member of the free-wheel clutch over-runs the driving member when the ratio of the input-shaft speed to the output-shaft speed is lower than that of the gear train including the free-wheel clutch, and which also comprises coupling means capable of operative engagement to couple the driven-member of the free-wheel clutch automatically, semi-automatically or at will, directly or indirectly to the input shaft so that the driven member is driven at a higher speed by the input shaft than by its co-operating driving member. The over-running of the free-wheel driven-member may be considered as arising from the fact that when the coupling means is operative to cause the driving-member to run at such higher speed there are two gear trains of different ratio coupling the input and output shafts, the difference in ratio being accommodated by the over-running of the free-wheel driven-member.

When a car is provided with a change-speed gear as above described, a peculiarity arises in that if the car is allowed to stop facing up an incline with the coupling operatively engaged any backward movement of the car causes the gears to lock. This happens because there is a driving connection from the road-wheels to the engine of the car through at least two trains of different ratio, and the free-wheel, which accommodates this difference during forward movement of the car by over-running, engages and transmits a drive when the direction of motion of its driven-member is reversed. The locking of the gears in this way, in addition to stopping backward movement of the car also locks the change-speed-lever, so that it cannot be moved even to disengage the gears, and the car would need to be pushed up the incline to relieve the pressure on the locked gears to release the change-speed-lever.

A free-wheel clutch comprises essentially a driving-member, a driven-member and a locking part or parts which can move between an operative position and an inoperative position; these parts are usually rollers, balls or pawls and are automatically operative to lock the two members together to transmit a drive in one direction of rotation and are inoperative to permit the driven-member to over-run the driving member. The other function of a free-wheel, which is to prevent a drive being transmitted if the direction of rotation of the driving-member is reversed, is not of interest in the case of a free-wheel used in a change-speed-gear as above described since the driving shaft from the engine always rotates in the same direction, except in the special instance above described when a car goes backwards with one or other of the normal forward gear-ratios in engagement.

The object of this invention is to avoid the difficulty above mentioned, of the locking of the change-speed-lever.

According to the present invention a change-speed gear for cars comprises an input shaft; an output shaft; a train of gears for transmitting the drive from the input shaft to the output shaft at one ratio of the input shaft speed to the output shaft speed, said train of gears including a free-wheel clutch comprising a driving member rotatively driven by the input shaft, a driven member rotatively connectible with the output shaft, and locking parts for drivingly connecting the driving and driven members in a manner permitting the driven member to over-run the driving member when the ratio of the speed of the input shaft to the speed of the output shaft is lower than the ratio provided by said train of gears; means drivingly interconnecting the input and output shafts through the said driven member to give a speed ratio lower than that afforded by said train of gears, said means including a sliding coupling member arranged to move between a position in which the sliding coupling member is disengaged from the input shaft and an engaged position in which it couples the input shaft to the free wheel driven member, and means to engage and disengage said coupling; a locking-part-displacing tappet mounted in the driving member for sliding movement therein to displace the locking parts from their operative position to their inoperative position; a cam element slidingly mounted in the free-wheel driving member, engaged with the sliding coupling member to be moved thereby and having a cam surface engaged by the locking-part-displacing tappet, through which cam surface the locking-part-displacing tappet is displaced to the position in which the locking parts are rendered inoperative when the sliding coupling member moves into engagement with the input shaft.

There will now be described one embodiment of the above and other features of this invention as applied to a change-speed gear such as described in co-pending U. S. patent application Serial No. 767,903, filed August 11, 1947, now Patent No. 2,504,904, issued April 18, 1950, reference being made in the description to the accompanying diagrammatic drawings in which:

Figure 1 illustrates a change-speed gear as described in the above-mentioned application;

Figure 2 illustrates in partial section part of this change-speed gear with means to move the locking members of a free-wheel clutch positively to their inoperative position;

Figure 3 is a section on the line 3—3 of Figure 2 through the free-wheel clutch;

Figure 4 is a section on the line 4—4 of Figure 2; and

Figure 5 illustrates a modification.

The change-speed-gear described in the above mentioned application is of normal construction in so far as it comprises an input shaft 10 carrying a gear-wheel 11 which is constantly in mesh with a gear-wheel 12 carried on a lay shaft 13 which carries three further gears 14, 15, 16 which respectively drive gears 17, 18 and 19 mounted co-axially with the output shaft 20. A reversing train 21 is also provided, and the reverse, neutral and first or lowest gears are selected by sliding the co-operating gear 19 on the output shaft 20 by means of fork 22. A synchromesh coupling 23 is provided for engaging the second gear-ratio and is also used for engaging the 3rd and 4th gears by its alternative setting, in the manner now about to be described, the selection between the positions of the synchromesh gear being effected by fork 24.

The gear-wheel 17 for the 3rd speed is mounted freely on a hollow shaft 25 which in turn is mounted on the output shaft 20, and a free-wheel clutch 26, 27, 28 is provided, being arranged in such a manner that the gear-wheel 17 can drive the hollow shaft 25, and that the hollow shaft 25 can over-run the gear-wheel 17; so far as the over-running or free-wheel clutch is concerned, the hollow shaft 25 has secured to it the driven-member 27 of the free wheel clutch and the gear-wheel is formed with an extension which constitutes the driving-member 26.

This hollow shaft 25 has splined on it a sliding coupling sleeve 29 which is arranged to engage the input-shaft 10 when it is in one position or to be withdrawn from such engagement in its alternative position and in this setting it merely rotates with the hollow shaft and has no driving engagement with any other part. The sliding sleeve 29 is controlled by a fork 30 and is illustrated as engaging the input shaft through dogs or teeth 31.

The control or selection of the transmission-ratio in the gear-box as above described is effected by the usual type of control-lever and connections, in so far as reverse, first and second gears are concerned, and this lever is also used to provide in a single position for either the third or fourth ratios, the selection between the third and fourth ratios being effected by means of the sliding coupling sleeve aforesaid.

In such a gear-box, it is usual for the sliding sleeve 29 to be engaged with the input-shaft 10 to drive the free-wheel driven-member except when 3rd gear is engaged. As a result if a car fitted with the gear-box is left facing uphill with 1st, 2nd or 4th gear engaged and tries to run backwards two gear ratios will become engaged automatically and the change-speed-gear lever will become locked.

If the sliding coupling sleeve is engaged with the input-shaft only when 4th gear is engaged, then locking of the change-speed lever will only occur on backward running of the car with 4th gear engaged.

To avoid this difficulty an arrangement such as is illustrated in Figures 2 to 4 is adopted.

In these figures the same references are used as in Figure 1 to indicate like parts. In these figures, moreover the splines 32 by which the sleeve 29 engages with the hollow shaft 25 are also employed to ensure the driving engagement with the input shaft 10 which is, for this purpose, formed with co-acting splines 33.

The locking parts 28 of the free-wheel clutch are shown as rollers and they are held in relation to one another by a cage formed in two parts 34, 35 which are secured together by rivets 36. A thrust ring 37 is provided between the end of the gear member 17 and the end flange 25a of the hollow shaft 25 and the free-wheel clutch driven member 27 is engaged with the flange 25a through teeth or splines 38 and a circlip 39.

The normal direction of rotation of the driving member 26 of the free-wheel clutch is indicated by arrow 50.

To ensure that the cage 34, 35 (and thus the rollers 28) are moved to the inoperative position, indicated by chain lines at the top of Figure 3, when the sliding sleeve 29 occupies the chain line position of Figure 2 in engagement with the input shaft 20, the free-wheel driving-member 26 is formed with a substantially tangential recess in which slides a plunger-like tappet 40, hereinafter referred to as a locking-part-displacing tappet. This tappet is capable of occupying two positions in one of which, illustrated in chain lines in Figures 3 and 4, it projects from the periphery of the free-wheel driving member 26 to engage a shoulder 41 on the the cage element 34 and holds the cage 34, 35 in a position in which the rollers 28 will not transmit a drive, and in the other of which positions illustrated in full lines, it frees the cage to allow the rollers 28 to transmit a drive. The required angular movement of the cage 34, 35 is small and is indicated by the chain lines X, Y, Z. When the roller 28a to which these lines relate is located with its centre between the lines X, Y the free-wheel clutch is operative, i. e. a drive is transmitted through it, and when the centre lies between lines Y, Z the free-wheel clutch is inoperative.

The movement of the locking-part-displacing tappet 40 is controlled by a slider 42 received in an axial recess 43 in the gear-wheel 17 and the slider is formed at one end with a depression 44 forming a cam surface to engage the inner end of the locking-part-displacing tappet 40 and at its other end with a hooked feature 45 which projects from the end face of the gear-wheel 17 and engages in an inwardly-facing groove 46 in the sliding sleeve 29.

The arrangement is such that when the sliding sleeve 29 moves into engagement with the input-shaft 10 to couple the free-wheel driven-member 27 directly to the input-shaft 10, the slider 42 is drawn along its recess 43 by the sliding sleeve 29 and the cam surface acts on the locking-part-displacing tappet 40 to cause it to engage the shoulder 41 on the roller cage 34, 35 and displace the cage to a position in which the rollers 28 do not transmit a drive. The rollers are thus held positively in the inoperative position and if the car is left facing uphill with the sliding sleeve 29 engaged with the input-shaft 10, on backward running of the car, a drive cannot be transmitted through the free-wheel clutch so that locking of the gear-lever is avoided.

On disengagement of the sliding sleeve 29 from the input-shaft 10, the locking-part-displacing tappet 40 is withdrawn from engagement with the cage 34, 35 thus permitting the rollers 28 to move to a drive transmitting position.

Another important feature of this invention is the provision of limit means to prevent rotational displacement of the cage 34, 35 and thus rollers 28 relative to the free-wheel driving-member 26 from its operative position to such an extent that the rollers 28 will occupy a drive-transmitting position in the reverse direction from the inoperative position.

The limit means comprises a tappet 47, hereinafter referred to as a limit tappet, which is similar to the locking-part-displacing tappet 40, but which is freely slidable in a substantially tangential recess 48 in the driving-member 26 and is arranged to project from the periphery of the driving-member 26 in a direction opposite to that in which locking-part-displacing tappet 40 projects, to co-operate with a second shoulder 49 on the cage 34, 35. When the locking-part-displacing tappet 40 displaces the cage to the inoperative position the shoulder 49 engages the limit tappet 47 and causes it to slide in its recess 48 until the inner end of the limit tappet abuts the bottom of the recess and thereby limits the movement of the cage from the operative position. The limit tappet 47 in this arrangement prevents the centre of the roller 28a from being displaced away from line Y beyond line Z. The point at which the shoulder 49 contacts the limit tappet 47 will vary according to the position of the limit tappet in its recess 48 in which the limit tappet slides under control of inertia effects. In this arrangement no means is provided to ensure that when the free wheel is operative, the limit tappet 47 is engaged with the shoulder 49.

The limit tappet 47 is located in the driving-member at a point opposite the locking-part-displacing tappet 40 to balance the driving-member 26.

An alternative arrangement of the limit tappet 47 is illustrated in Figure 5. In this construction the tappet 47 has its inner end formed of reduced diameter and a spring 51 is located between the limit tappet and the bottom of the recess 48. The spring 51 lightly loads the limit tappet 47 to hold it in engagement with the shoulder 49 thereby avoiding hammering in operation. The spring load afforded by the spring 51 also assists to urge the cage and rollers from the inoperative position to the operative position when the sliding sleeve 29 is disengaged from the input shaft 10.

Whilst it is preferred to provide a limit tappet 47 as above described, the same effect can be achieved by providing a projecting tooth on the free-wheel clutch driving member 26 to engage with a shoulder, such as the shoulder 49, to limit the angular movement of the cage 34, 35 relative to the driving member 26 in a direction away from the normal driving position towards the inoperative position.

From the foregoing description it will be seen that the invention provides a change-speed-gear of the type referred to in which locking of the gear-lever and gears on reverse running of the car is avoided in a simple and positive manner.

I claim:

1. A change-speed gear for cars comprising an input shaft; an output shaft; a train of gears for transmitting the drive from the input shaft to the output shaft at one ratio of the input shaft speed to the output shaft speed, said train of gears including a free-wheel clutch comprising a driving member rotatively driven by the input shaft, a driven member rotatively connectible with the output shaft, and locking parts for drivingly connecting the driving and driven members in a manner permitting the driven member to over-run the driving member when the ratio of the speed of the input shaft to the speed of the output shaft is lower than the ratio provided by said train of gears; means drivingly interconnecting the input and output shafts through the said driven member to give a speed ratio lower than that afforded by said train of gears, said means including a sliding coupling member arranged to move between a position in which the sliding coupling member is disengaged from the input shaft and an engaged position in which it couples the input shaft to the free wheel driven member, and means to engage and disengage said coupling; a lock-part-displacing tappet mounted in the driving member for sliding movement therein to displace the locking parts from their operative position to their inoperative position; a cam element slidingly mounted in the free-wheel driving member, engaged with the sliding coupling member to be moved thereby and having a cam surface engaged by the locking-part-displacing tappet, through which cam surface the locking-part-displacing tappet is displaced to the position in which the locking parts are rendered inoperative when the sliding coupling member moves into engagement with the input shaft.

2. A change-speed gear as claimed in claim 1, wherein said cam element is slidably received in an axial recess in the free wheel driving member, is formed at one end with said cam surface and is formed at its opposite end with a hooked feature to engage with an annular recess on the sliding coupling member, and wherein said locking-part-displacing tappet is received in a substantially tangential recess in the free wheel driving member which recess opens into said axial recess to permit engagement of the cam surface and locking-part-displacing tappet.

3. A change-speed gear for cars comprising an input shaft; an output shaft; a train of gears for transmitting the drive from the input shaft to the output shaft at one ratio of the input shaft speed to the output shaft speed, said train of gears including a free-wheel clutch comprising a driving member rotatively driven by the input shaft, a driven member rotatively connectible with the output shaft, and locking parts for drivingly connecting the driving and driven members in a manner permitting the driven member to over-run the driving member when the ratio of the speed of the input shaft to the speed of the output shaft is lower than the ratio provided by said train of gears; means drivingly interconnecting the input and output shafts through the said driven member to give a speed ratio lower than that afforded by said train of gears, said means including a disengageable coupling having an operative position in which the driven member is coupled to the input shaft otherwise than through the clutch driving member, and means to engage and disengage said coupling; locking-part-displacing means to move the free-wheel clutch locking parts to a position in which they are inoperative to drivingly connect the driven member to the driving member; an operative connection between said coupling and said locking-part-displacing means to cause the locking parts to be moved to their inoperative position when the coupling is engaged; a limit tappet slidably located in a substantially tangential recess in the free-wheel driving member; and a cage locating the locking parts relative to one another, said cage having a shoulder to engage the limit tappet on rotation of the cage relative to the driving member in the direction of normal rotation of the driving member to urge the limit tappet to the bottom of its recess thereby to limit rotation of the cage relative to the driving member in said direction.

4. A change-speed gear as claimed in claim 3, comprising also a light spring in the limit tappet recess to load the limit tappet towards engagement with the shoulder.

5. A change-speed gear for cars comprising an input shaft, an output shaft; a train of gears for transmitting the drive from the input shaft to the output shaft at one ratio of the input shaft speed to the output shaft speed, said train of gears including a free-wheel clutch comprising a driving member rotatively driven by the input shaft, a driven member rotatively connectible with the output shaft, and locking parts for drivingly connecting the driving and driven members in a manner permitting the driven member to over-run the driving member when the ratio of the speed of the input shaft to the speed of the output shaft is lower than the ratio provided by said train of gears; means drivingly interconnecting the input and output shafts through the said driven member to give the speed ratio lower than that afforded by said train of gears, said means including a disengageable coupling having an operative position in which the driven member is coupled to the input shaft otherwise than through the clutch driving member, and means to engage and disengage said coupling; a locking-part-displacing tappet mounted in the driving member for sliding movement therein to displace the locking parts from their operative position to their inoperative position; a connection between the coupling and the locking-part-displacing tappet to control the sliding movement thereof and to move the locking-part-displacing tappet to the position in which the locking parts are inoperative when the coupling is being engaged; a limit tappet slidably located in a substantially tangential recess in the free-wheel driving member; and a cage locating the locking parts relative to one another, said cage having a shoulder to engage the limit tappet on rotation of the cage relative to the driving member in the direction of normal rotation of the driving member to urge the limit tappet to the bottom of its recess thereby to limit rotation of the cage relative to the driving member in said direction.

6. A change-speed gear as claimed in claim 5, comprising also a light spring in the limit tappet recess to load the limit tappet towards engagement with the shoulder.

7. A change-speed gear for cars comprising an input shaft, an output shaft, a layshaft, a train of gears carried on said shafts and arranged to be driven from the input shaft, one of said gears being freely rotatable on the output shaft, and interconnecting the input shaft with the output shaft to give a ratio of input shaft speed to output shaft speed greater than 1; a free-wheel clutch having a driving member freely mounted on the output shaft and arranged to rotate with said gear which is freely rotatable on the output shaft, a driven member, means arranged to connect said driven member with the output shaft, locking parts for drivingly connecting the driving and driven members in a manner permitting the driven member to over-run the driving member when the ratio of the input shaft speed to the output shaft speed is lower than that afforded by the gear train, and a cage locating the locking members with respect to one another; a sliding coupling sleeve rotatable with and slidable on the free wheel driven member between a disengaged position in which it is disengaged from the input shaft, and an engaged position in which the coupling sleeve couples the input shaft directly to the free-wheel driven member and in which the free-wheel driven member is driven at a greater speed than by the free-wheel driving member; means to displace the coupling sleeve between its engaged and disengaged positions; a locking-part-displacing tappet slidably housed in a substantially tangential recess in the free wheel driving member; a shoulder on the cage to be engaged by one end of the locking-part-displacing tappet; and a cam element slidable in an axial recess in the free wheel driving member, which axial recess opens into the substantially tangential recess, said cam element having a cam surface engaged with the other end of said locking-part-displacing tappet and a hooked feature engaged with an annular recess in the coupling sleeve whereby the cam element slides with the coupling sleeve, said cam surface being so formed that, when the coupling sleeve is moved into its engaged position, the locking-part-displacing tappet is displaced in its recess, engages the shoulder and through the cage moves the locking parts to a position in which they are inoperative to transmit a drive between the free wheel driving and driven members.

8. A change-speed gear as claimed in claim 7, comprising also means to limit angular movement of the locking parts relative to the driving member from their normal operative position towards their inoperative position to prevent their moving to a reverse operative position on the opposite side of the inoperative position from the normal operative position.

9. A change-speed gear as claimed in claim 7, having also a second substantially tangential recess provided in the free wheel driving member to extend in a direction opposite to the recess accommodating the locking-part-displacing tappet, a limit tappet is slidably located in said second substantially tangential recess, and a second shoulder on the cage, said second shoulder engaging the limit tappet and urging against the bottom of its recess during movement of the locking parts into the inoperative position thereby to prevent displacement of the locking parts to a reverse operative position on the side of the inoperative position remote from their normal operative position.

10. A change-speed gear as claimed in claim 9, comprising also a light spring in said second substantially tangential recess to load the limit tappet into engagement with the second shoulder on the cage.

11. A change-speed gear as claimed in claim 10, wherein limit tappet is located in the free wheel driving member at a position diametrically opposite the locking-part-displacing tappet.

FRANK HENRY TARLTON.

(References on following page)

REFERENCES CITED

The following references are of record in the file of this patent:

UNITED STATES PATENTS

| Number | Name | Date |
|---|---|---|
| 1,955,698 | Bushong | Apr. 17, 1934 |
| 2,286,760 | Peterson | June 16, 1942 |
| 2,299,739 | Colucci | Oct. 27, 1942 |
| 2,309,864 | Patterson | Feb. 2, 1943 |
| 2,343,312 | Maurer | Mar. 7, 1944 |
| 2,453,794 | Iavelli | Nov. 16, 1948 |

FOREIGN PATENTS

| Number | Country | Date |
|---|---|---|
| 436,967 | France | Feb. 5, 1912 |